United States Patent
Cho et al.

(10) Patent No.: US 7,903,981 B2
(45) Date of Patent: Mar. 8, 2011

(54) SOFTWARE-BASED ELECTRO-OPTIC MODULATOR BIAS CONTROL SYSTEMS AND METHODS

(75) Inventors: Steve S. Cho, Potomac, MD (US); Cecil D. Smith, Woodbine, MD (US)

(73) Assignee: Ciena Corporation, Linthicum, MD (US)

( * ) Notice: Subject to any disclaimer, the term of this patent is extended or adjusted under 35 U.S.C. 154(b) by 1080 days.

(21) Appl. No.: 11/656,700

(22) Filed: Jan. 23, 2007

(65) Prior Publication Data
US 2008/0175598 A1  Jul. 24, 2008

(51) Int. Cl.
*H04B 10/04* (2006.01)

(52) U.S. Cl. ......... 398/198; 398/197; 398/195; 398/192; 398/183

(58) Field of Classification Search .......... 398/183, 398/186, 188, 192, 194–198, 195.183
See application file for complete search history.

(56) References Cited

U.S. PATENT DOCUMENTS

| | | | |
|---|---|---|---|
| 6,671,079 B2 * | 12/2003 | Fuller et al. | 359/264 |
| 6,700,907 B2 * | 3/2004 | Schneider et al. | 372/26 |
| 7,155,071 B2 * | 12/2006 | Stook et al. | 385/2 |
| 7,369,290 B1 * | 5/2008 | Cox et al. | 359/239 |
| 7,715,732 B2 * | 5/2010 | Koh et al. | 398/194 |
| 7,822,348 B2 * | 10/2010 | Webb et al. | 398/198 |
| 2003/0210914 A1 * | 11/2003 | Khayim et al. | 398/197 |
| 2006/0002714 A1 * | 1/2006 | Gill et al. | 398/147 |

* cited by examiner

*Primary Examiner* — Ken N Vanderpuye
*Assistant Examiner* — Hibret A Woldekidan
(74) *Attorney, Agent, or Firm* — Clements Bernard PLLC; Christopher L. Bernard; Tyler S. Brown

(57) ABSTRACT

The present invention provides a software-based electro-optic modulator bias control system resident in an optical transceiver including an electro-optic modulator that includes an optical-to-electrical converter including a transimpedance amplifier, an analog-to-digital converter, and a software algorithm, wherein the software algorithm is operable for determining an optimum bias voltage applied to the electro-optic modulator by discovering a maximum average optical power transmitted by the electro-optic modulator, or quadrature point, wherein the quadrature point is discovered by determining at what bias voltage the slope of an average optical power transmitted by the electro-optic modulator, defined as an optical power change given an incremental bias voltage change, is equal to zero. The software-based electro-optic modulator bias control system also includes a control loop operable for determining if a radio frequency port of the electro-optic modulator is driven to a peak-to-peak voltage that is greater than (over-driven) or less than (under-driven) the peak-to-trough voltage of a response curve of the electro-optic modulator.

24 Claims, 14 Drawing Sheets

US 7,903,981 B2

SOFTWARE-BASED ELECTRO-OPTIC MODULATOR BIAS CONTROL SYSTEMS AND METHODS

FIELD OF THE INVENTION

The present invention relates generally to software-based electro-optic modulator bias control systems and methods. More specifically, the present invention relates to software-based electro-optic modulator bias control systems and methods that utilize optical power slope detection and radio frequency (RF) drive level optimization.

BACKGROUND OF THE INVENTION

Electro-optic Mach-Zehnder modulators are ubiquitous devices found in high speed optical networking equipment and are the key components that allow the transmission of high speed data using a beam of light. One such type of electro-optic modulator (EOM) uses lithium niobate (LiNbO$_3$) crystals due to their low optical loss characteristics and high electro-optic coefficient. These modulators have a characteristic transmission response that is a function of the applied voltage, and typically require a direct current (DC) bias voltage to maintain the transmission response at a point that yields optimum transmission characteristics. However, one of the problems with lithium niobate modulators is that the transmission response, and thus the bias voltage, drifts over the long term due to temperature dependence and aging, requiring the use of a closed loop feedback circuit to maintain the optimum operating bias point. Conventional systems and methods for maintaining the optimum operating bias point utilize a low frequency dither signal imposed on the high frequency data signal, which is recovered in a feedback circuit. This is typically accomplished using complex analog circuitry. These systems and methods typically incorporate a low frequency sine, square, or triangular wave to amplitude modulate the high frequency RF data signal driving the modulator. An optical tap from the modulated output is passed through a transimpedance amplifier to convert the optical output signal to a voltage. A bandpass filter is used to recover either the fundamental tone or a harmonic of the original square wave. If the fundamental tone is recovered, the signal is synchronously detected and passed through a full wave rectifier. The resulting signal is then passed through an integrator which, ideally, has infinite DC gain and the resulting error signal is used to create the DC bias voltage for the modulator.

Thus, the conventional systems and methods for maintaining the optimum operating bias point utilize complex analog circuitry, a dither tone generation circuit, a transimpedance amplifier, a bandpass filter, and some sort of synchronous detection of the recovered signal. An error amplifier/integrator with low loop bandwidth is used to control the operating bias point.

There are several important drawbacks that are associated with the conventional systems and methods for maintaining the optimum operating bias point that are addressed by the systems and methods of the present invention. First, the conventional systems and methods require the use of multiple electronic components that take up board space and increase cost. Second, the conventional systems and methods require the synchronous detection of the recovered dither tone. This is typically accomplished by using the original dither signal to sample the recovered dither tone. Because the recovered dither tone is passed through a bandpass filter, there is a phase difference between the original dither signal and the recovered dither tone. In order to synchronize the detection, a phase adjustment of the sampling signal may be required to begin the sampling precisely at the start of each period of the recovered dither tone. This increases the complexity of the circuit. Third, the conventional systems and methods require that a bandpass filter be used to recover the dither tone. In order for this bandpass filter to be physically realizable, the dither tone must be of sufficiently high frequency such that the filter components are not too large; however, the frequency must not be so high such that it perturbs the data signal. Similarly, the dither tone must be of sufficiently high amplitude such that it may be recovered, however, the amplitude must not be so high such that it perturbs the data signal. Fourth, the conventional systems and methods require the use of a reset switch, which is typically software-controlled, to reset the integrator to avoid saturation. This may cause the modulator to become "stuck" at either extreme value of the integrator.

Thus, what are needed are improved software-based electro-optic modulator bias control systems and methods that utilize optical power slope detection and RF drive level optimization.

BRIEF SUMMARY OF THE INVENTION

In various exemplary embodiments, the present invention provides software-based electro-optic modulator bias control systems and methods that require only an optical-to-electrical (O/E) converter with a transimpedance amplifier, an analog-to-digital (A/D) converter, and a relatively simple software algorithm. In most cases, the O/E converter with the transimpedance amplifier and the A/D converter already exist on an optical transceiver. Therefore, only the software algorithm is required as additional equipment. The software-based electro-optic modulator bias control systems and methods utilize the characteristic transmission response of the electro-optic Mach-Zehnder modulator or the like, and are used not only to maintain the optimum operating bias point, but also to maintain the proper RF drive level to provide the maximum extinction ratio.

In one exemplary embodiment, a software-based electro-optic modulator bias control system resident in an optical transceiver including an electro-optic modulator includes: an optical-to-electrical converter including a transimpedance amplifier; an analog-to-digital converter; and a software algorithm, wherein the software algorithm is operable for determining an optimum bias voltage applied to the electro-optic modulator by discovering a maximum average optical power transmitted by the modulator, or quadrature point, wherein the quadrature point is discovered by determining at what bias voltage the slope of an average optical power transmitted by the modulator, defined as an optical power change given an incremental bias voltage change, is equal to zero. The radio frequency port of the electro-optic modulator is driven with a peak-to-peak voltage that is equal to the peak-to-trough voltage of a response curve of the electro-optic modulator. Thus, the software-based electro-optic modulator bias control system also includes a software control loop operable for determining if a radio frequency port of the electro-optic modulator is driven with a voltage that is greater than (over-driven) or less than (under-driven) the peak-to-trough voltage of the response curve of the electro-optic modulator by determining if, when the radio frequency drive level is increased, the average optical power transmitted by the modulator at the point of zero slope increases compared to the average optical power at the point of zero slope at the previous radio frequency drive level, or, when the radio frequency drive level is increased, the average optical power transmitted by the modulator at the point of zero slope decreases compared to the average optical power at the point of zero slope at the previous radio frequency drive level, respectively. If the radio frequency port of the electro-optic modulator is over-driven, the radio frequency drive level is decreased. If the radio frequency port of the electro-optic modulator is under-driven, the radio frequency drive level is increased. Optionally, the use of the software control loop is ceased when no optical power changes are detected. Optionally, the use of the software control loop is only undertaken when the radio frequency drive level falls outside of a predetermined optimum range. Preferably, the software algorithm is further operable for determining in which of a plurality of regions of a response curve of the electro-optic modulator the modulator is operating. Optionally, the electro-optic modulator is operated at a multiple of the quadrature point.

In another exemplary embodiment, an optical transceiver including an electro-optic modulator and a software-based electro-optic modulator bias control system includes: an optical-to-electrical converter including a transimpedance amplifier; an analog-to-digital converter; and a software algorithm, wherein the software algorithm is operable for determining an optimum bias voltage applied to the electro-optic modulator by discovering a maximum average optical power transmitted by the modulator, or quadrature point, wherein the quadrature point is discovered by determining at what bias voltage the slope of an average optical power transmitted by the modulator, defined as an optical power change given an incremental bias voltage change, is equal to zero. The radio frequency port of the electro-optic modulator is driven with a peak-to-peak voltage that is equal to the peak-to-trough voltage of a response curve of the electro-optic modulator. Thus, the optical transceiver also includes a software control loop operable for determining if a radio frequency port of the electro-optic modulator is driven with a voltage that is greater than (over-driven) or less than (under-driven) the peak-to-trough voltage of the response curve of the electro-optic modulator by determining if, when the radio frequency drive level is increased, the average optical power transmitted by the modulator at the point of zero slope increases compared to the average optical power at the point of zero slope at the previous radio frequency drive level, or, when the radio frequency drive level is increased, the average optical power transmitted by the modulator at the point of zero slope decreases compared to the average optical power at the point of zero slope at the previous radio frequency drive level, respectively. If the radio frequency port of the electro-optic modulator is over-driven, the radio frequency drive level is decreased. If the radio frequency port of the electro-optic modulator is under-driven, the radio frequency drive level is increased. Optionally, the use of the software control loop is ceased when no optical power changes are detected. Optionally, the use of the software control loop is only undertaken when the radio frequency drive level falls outside of a predetermined optimum range. Preferably, the software algorithm is further operable for determining in which of a plurality of regions of a response curve of the electro-optic modulator the modulator is operating. Optionally, the electro-optic modulator is operated at a multiple of the quadrature point.

In a further exemplary embodiment, a software-based electro-optic modulator bias control method for use in an optical transceiver including an electro-optic modulator includes: providing an optical-to-electrical converter including a transimpedance amplifier; providing an analog-to-digital converter; and providing a software algorithm, wherein the software algorithm is operable for determining an optimum bias voltage applied to the electro-optic modulator by discovering a maximum average optical power transmitted by the modulator, or quadrature point, wherein the quadrature point is discovered by determining at what bias voltage the slope of an average optical power transmitted by the modulator, defined as an optical power change given an incremental bias voltage change, is equal to zero. The radio frequency port of the electro-optic modulator is driven with a peak-to-peak voltage that is equal to the peak-to-trough voltage of a response curve of the electro-optic modulator. Thus, the software-based electro-optic modulator bias control method also includes providing a software control loop operable for determining if a radio frequency port of the electro-optic modulator is driven with a voltage that is greater than (over-driven) or less than (under-driven) the peak-to-trough voltage of the response curve of the electro-optic modulator by determining if, when the radio frequency drive level is increased, the average optical power transmitted by the modulator at the point of zero slope increases compared to the average optical power at the point of zero slope at the previous radio frequency drive level, or, when the radio frequency drive level is increased, the average optical power transmitted by the modulator at the point of zero slope decreases compared to the average optical power at the point of zero slope at the previous radio frequency drive level, respectively. If the radio frequency port of the electro-optic modulator is over-driven, the radio frequency drive level is decreased. If the radio frequency port of the electro-optic modulator is under-driven, the radio frequency drive level is increased. Optionally, the use of the software control loop is ceased when no optical power changes are detected. Optionally, the use of the software control loop is only undertaken when the radio frequency drive level falls outside of a predetermined optimum range. Preferably, the software algorithm is further operable for determining in which of a plurality of regions of a response curve of the electro-optic modulator the modulator is operating. Optionally, the electro-optic modulator is operated at a multiple of the quadrature point.

BRIEF DESCRIPTION OF THE DRAWINGS

The present invention is illustrated and described herein with reference to the various drawings, in which like reference numbers are used to denote like system components and/or method steps, as appropriate, and in which.

DETAILED DESCRIPTION OF THE INVENTION

Figure 1:
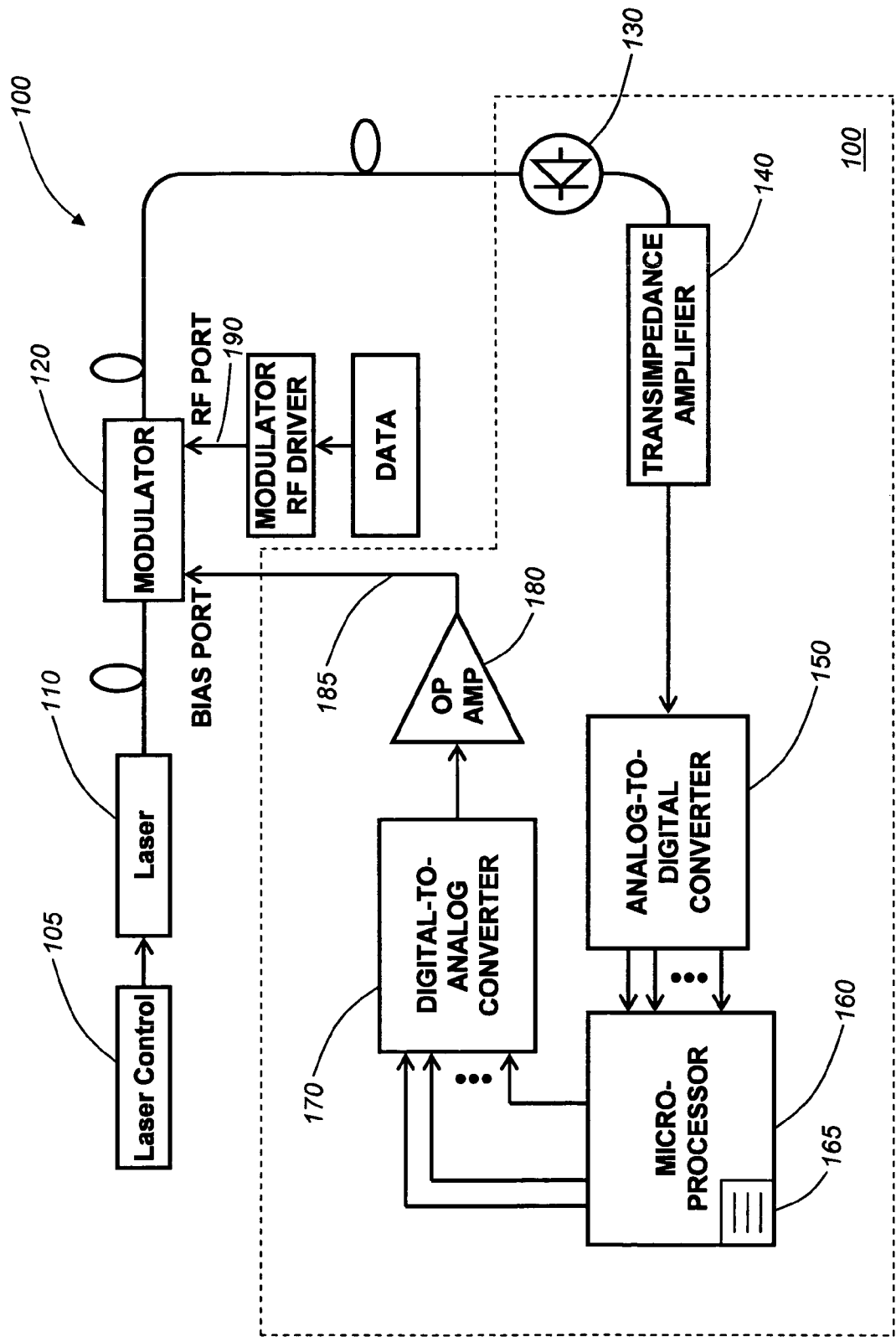
FIG. 1 is a schematic diagram illustrating one exemplary embodiment of the software-based electro-optic modulator bias control system of the present invention.
Figure 2:
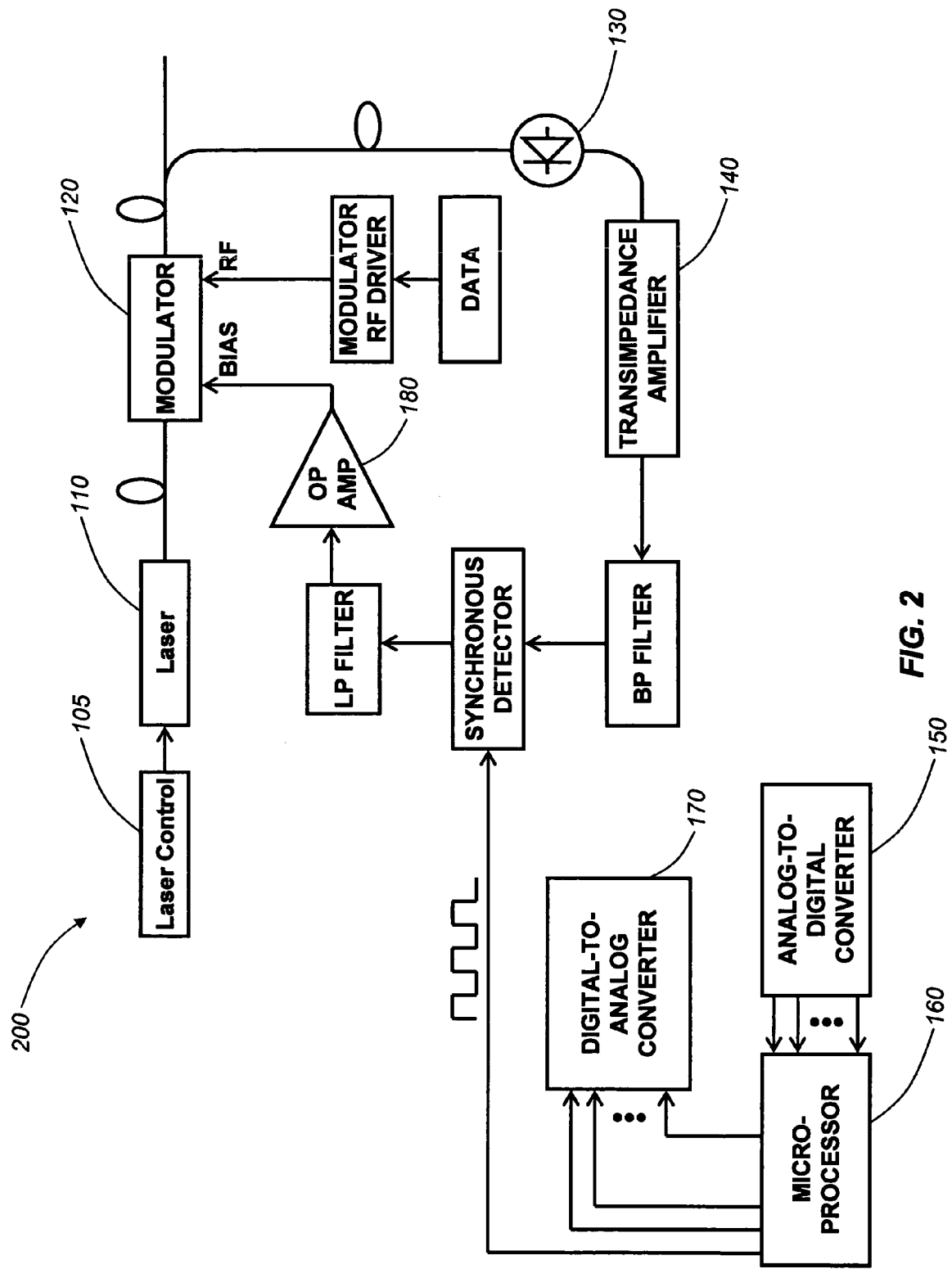
FIG. 2 is a schematic diagram illustrating a conventional system and method for maintaining an optimum operating bias point.

Referring to FIG. 1, in one exemplary embodiment, the present invention provides a software-based electro-optic modulator bias control system 100 that includes a photodiode monitor 130, a transimpedance amplifier 140, an A/D converter 150, a microprocessor 160, a D/A converter 170, an operational amplifier 180, and a relatively simple software algorithm 165 resident in the microprocessor 160. In most cases, the photodiode monitor 130, the transimpedance amplifier 140, the A/D converter 150, the microprocessor 160, the D/A converter 170, and the operational amplifier 180 already exist on an optical transmitter 200 (see, for example, FIG. 2). Therefore, only the software algorithm 165 is required as additional equipment. The software-based electro-optic modulator bias control system 100 utilizes the characteristic transmission response of an electro-optic Mach-Zehnder modulator 120 or the like, and is used not only to maintain the optimum operating bias point 185, but also to maintain the proper RF drive level 190 to provide the maximum extinction ratio.

Figure 3:
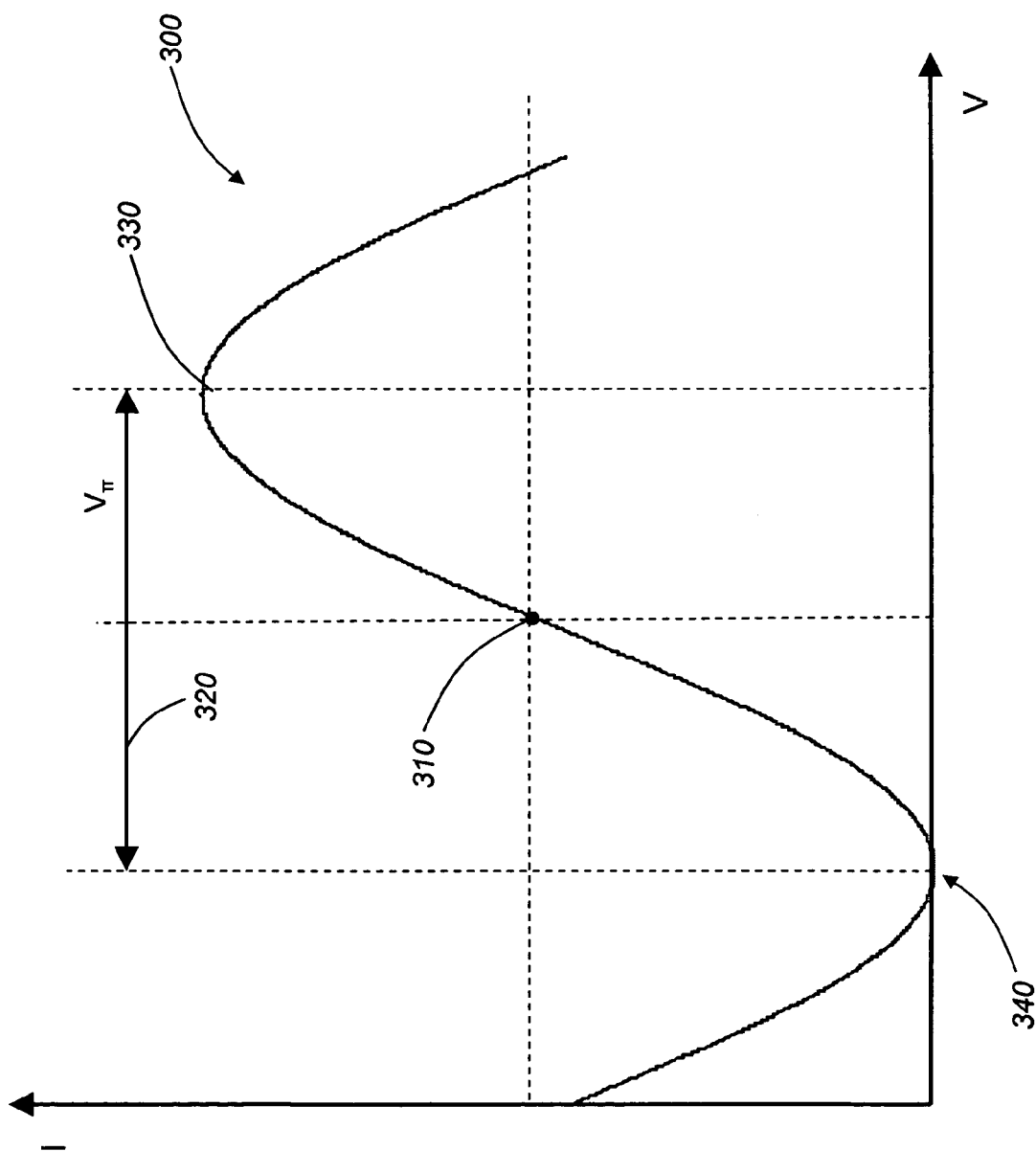
FIG. 3 is a graph illustrating an exemplary modulator response curve, the modulator typically operated at the point of optimum transmission characteristics, referred to as the quadrature point (at this quadrature point, the average transmitted power is maximized when the modulator is modulated with an RF signal with a peak-to-peak level that drives the modulator between the maximum and minimum transmission points)
Figure 4:
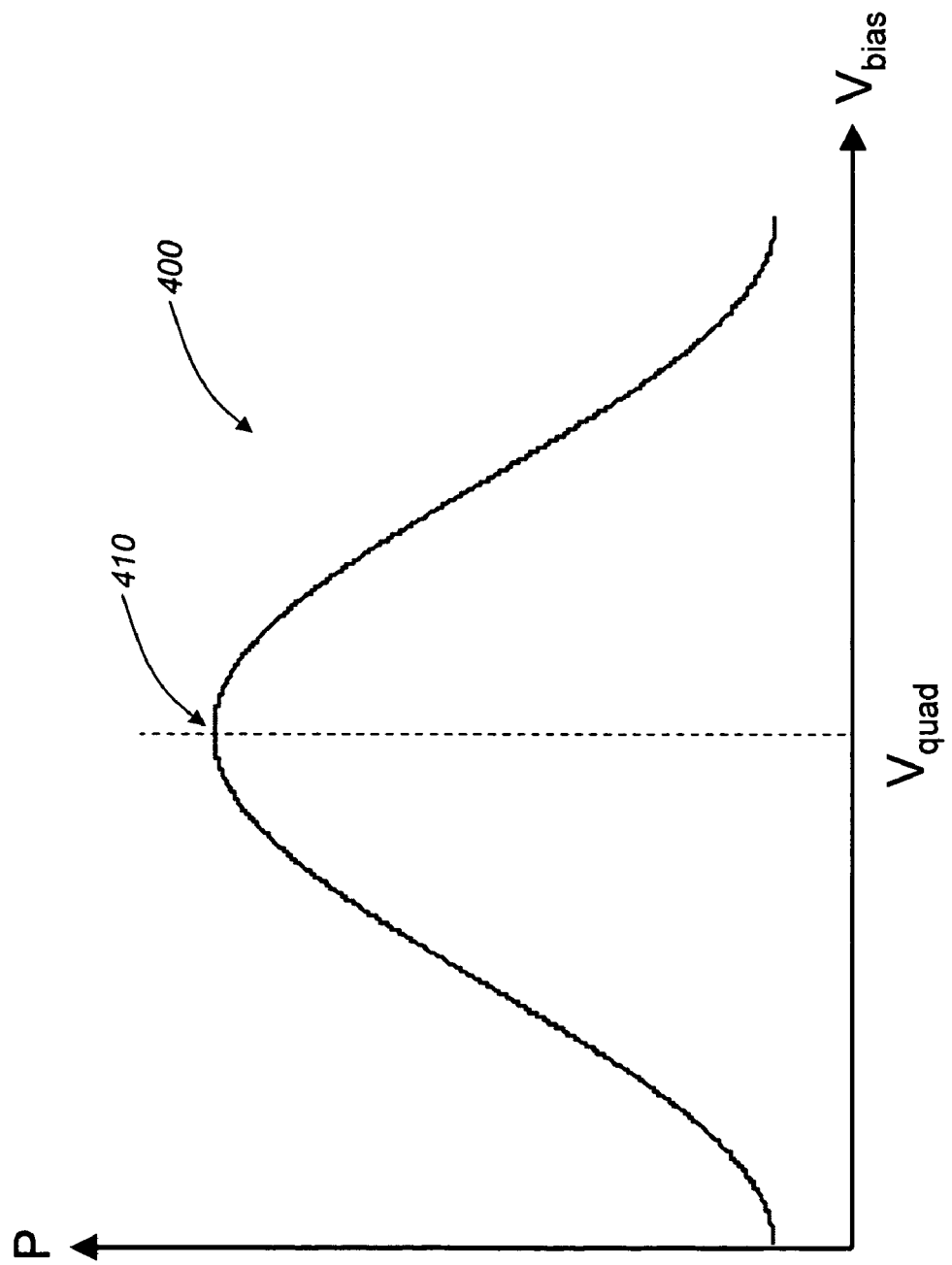
FIG. 4 is a graph illustrating the normalized average power, which, when modulated with a high frequency RF signal that drives the modulator between the maximum and minimum transmission points, is maximum at the quadrature point (the point where the bias voltage=$V_{quad}$)
Figure 5:
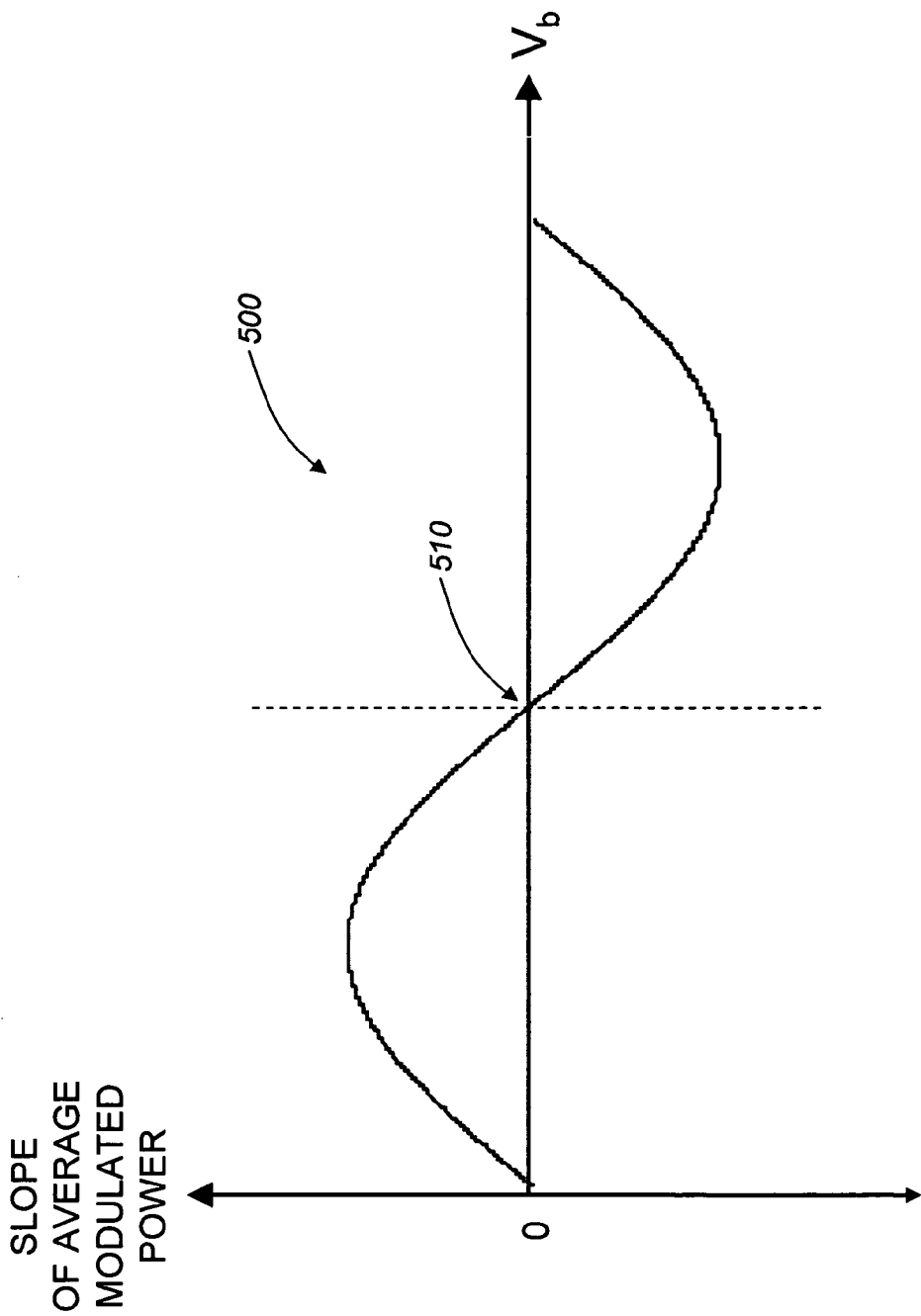
FIG. 5 is a graph illustrating the slope of the average power as a function of bias voltage when modulated with an RF signal that drives the modulator between the maximum and minimum transmission points.

Referring to FIGS. 3-5, when the voltage applied to the modulator 120 (FIG. 1) is varied, the optical transmission varies in a sinusoidal manner (see FIG. 3). At the bias voltage for optimum transmission characteristics, the bias point 310 is termed quadrature and is the point at which peak modulator response is obtained (i.e. maximum extinction ratio for a given amount of RF drive). When the modulator 120 is electrically driven with a high frequency data signal at an amplitude that is equal to the voltage difference 320 between the optical transmission minimum insertion loss point 330 and maximum insertion loss point 340, the voltage difference 320 is termed V, and the average power varies depending on the bias voltage (see FIG. 4). At the quadrature point, the average modulated optical power is at a maximum 410. One approach to maintaining the optimum bias point is to detect the point at which the maximum average modulated power 410 is transmitted and then use that value to maintain the bias point. However, as the continuous wave (CW) optical power input to the modulator 120 may fluctuate, this is not a simple task. A better approach is to use the slope of the average modulated power (see FIG. 5), where the slope is defined as the average power change given an incremental bias voltage change. Using the slope has the advantage that it is impervious to not only changes in the optical input, but also to variation in responsivity of the photodiode monitor 130 (FIG. 1), which may vary with temperature. At the point of maximum transmission (i.e. maximum average modulated power), or quadrature point, the slope of the average power becomes zero 510.

Figure 6:
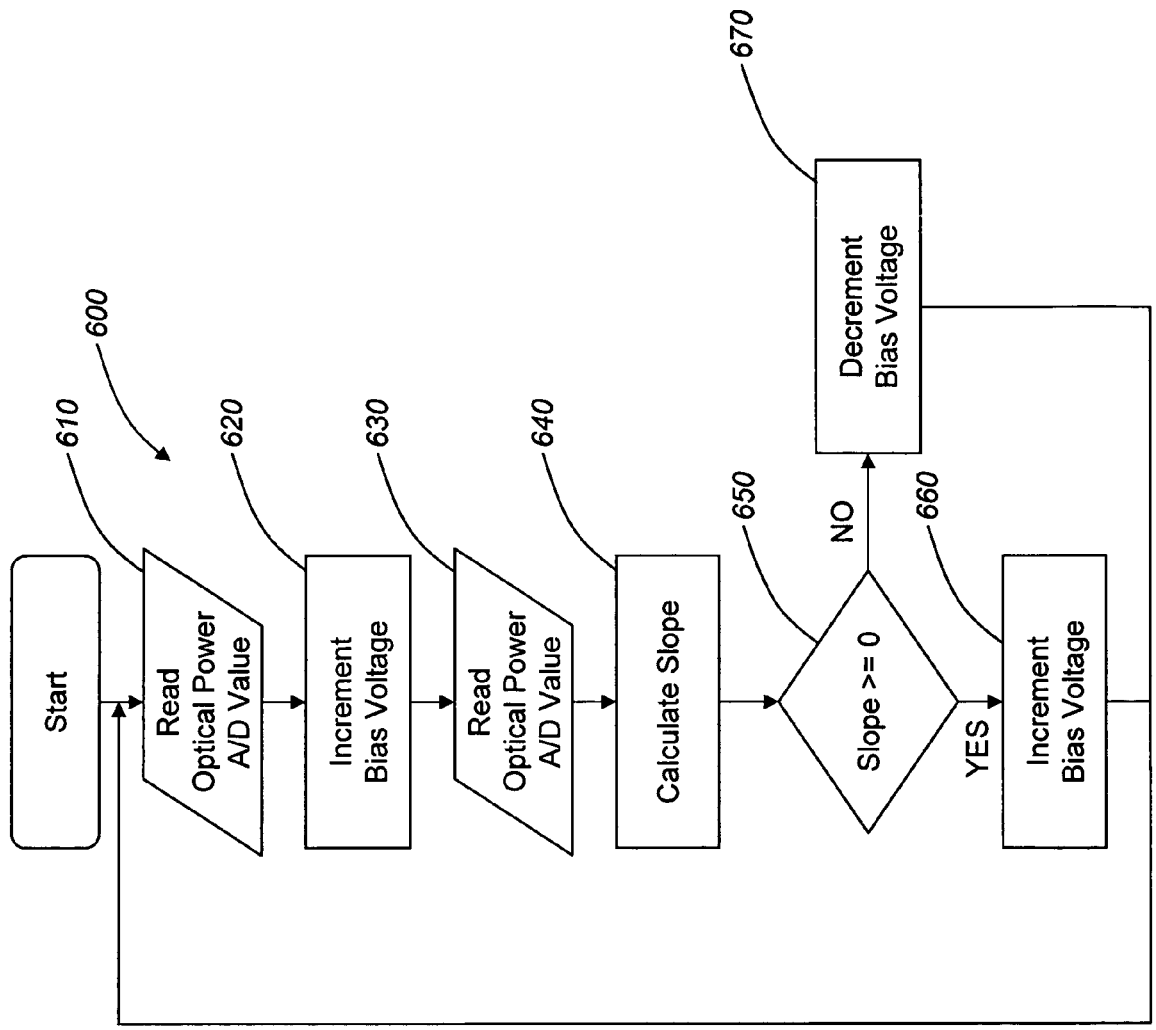
FIG. 6 is a flowchart illustrating one exemplary embodiment of a software control algorithm for controlling the modulator to the quadrature point.

Therefore, referring to FIG. 6, a software control algorithm 600 for controlling the modulator 120 (FIG. 1) to the quadrature point 310 (FIG. 3) includes obtaining an optical power measurement of the average modulated power using the photodiode monitor 130 (FIG. 1) and a tap, converting the photocurrent to a voltage using the transimpedance amplifier 140 (FIG. 1), and digitizing using the A/D converter 150 (FIG. 1) to obtain a value 610. The bias voltage 185 (FIG. 1) is then incremented 620 using the D/A converter 170 (FIG. 1) and the operational amplifier 180 (FIG. 1), and another power measurement is obtained, resulting in another A/D converter value 630. The slope 640, defined as the average power change divided by the incremental bias voltage, is calculated using these values and, if the slope is greater than zero, then the bias voltage is increased 660 to move the bias voltage closer to the quadrature point 510. If the slope 640 is less than zero, then the bias voltage is decreased 670 to move the bias voltage closer to the quadrature point 510. The process is repeated until a slope of zero is achieved.

This software control algorithm 600 for controlling the modulator 120 to the quadrature point works relatively well if the modulator RF port 190 (FIG. 1) is driven at precisely the Vπ level (i.e. to the peak and trough of the modulator response curve). If the modulator RF port 190 is either under-driven or over-driven, then the quadrature point will not fall at the point where the slope of the average power is zero, and will be farther away depending on how far the RF drive is off from the Vπ level.

Figure 7:
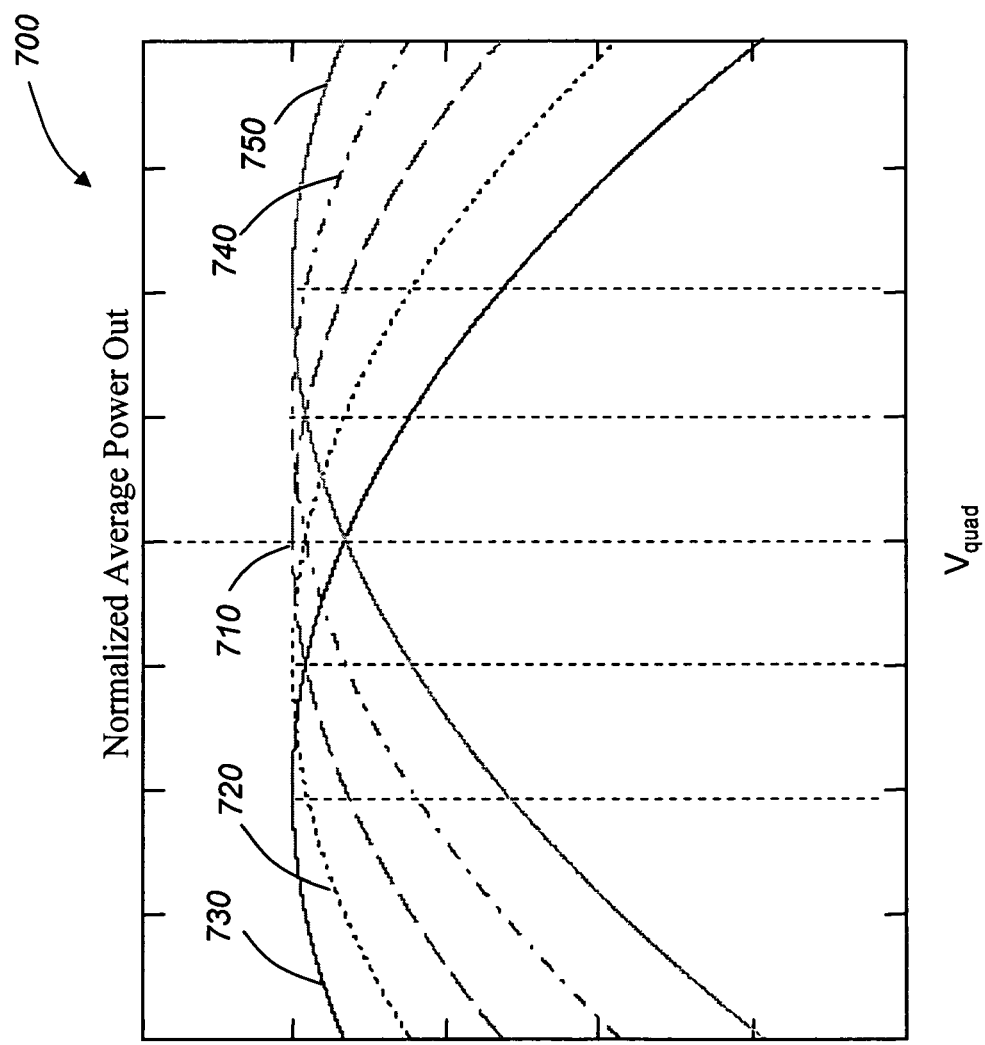
FIG. 7 is a graph illustrating the normalized average power response of the modulator for different RF drive levels.

FIG. 7 illustrates the modulator response of average modulated optical power for various RF drive levels. For an optimal peak-to-peak drive level of Vπ, the modulator response 710 illustrates the quadrature point (Vquad) coincident with the maximum power point, where the slope is zero. For RF drive level that is under-driven by 100 mV, the modulator response 720 illustrates the maximum power point that is slightly away from the true quadrature point and, thus, the slope at quadrature point is not equal to zero. When the RF drive level is under-driven by 200 mV, the modulator response 730 illustrates the maximum power point that is much further away from the quadrature point and, thus, the slope at quadrature point is much less than zero. For RF drive level that is over-driven by 100 mV, the modulator response 740 illustrates the maximum power point that is slightly away from the true quadrature point and, thus, the slope at quadrature point is not equal to zero. When the RF drive level is over-driven by 200 mV, the modulator response 750 illustrates the maximum power point that is much further away from the quadrature point and, thus, the slope at quadrature point is much greater than zero.

Computer simulations of the software control algorithm 600 (FIG. 6) were run, assuming a 16-bit A/D converter 150 (FIG. 1) with a 4.096 V input span and a transimpedance value that converts the maximum optical power to voltage that yields a voltage relatively close to the maximum analog input voltage of the A/D converter 150. A starting value of −1 V was also assumed for the initial bias voltage, with 0 V being the quadrature point.

Figure 8:
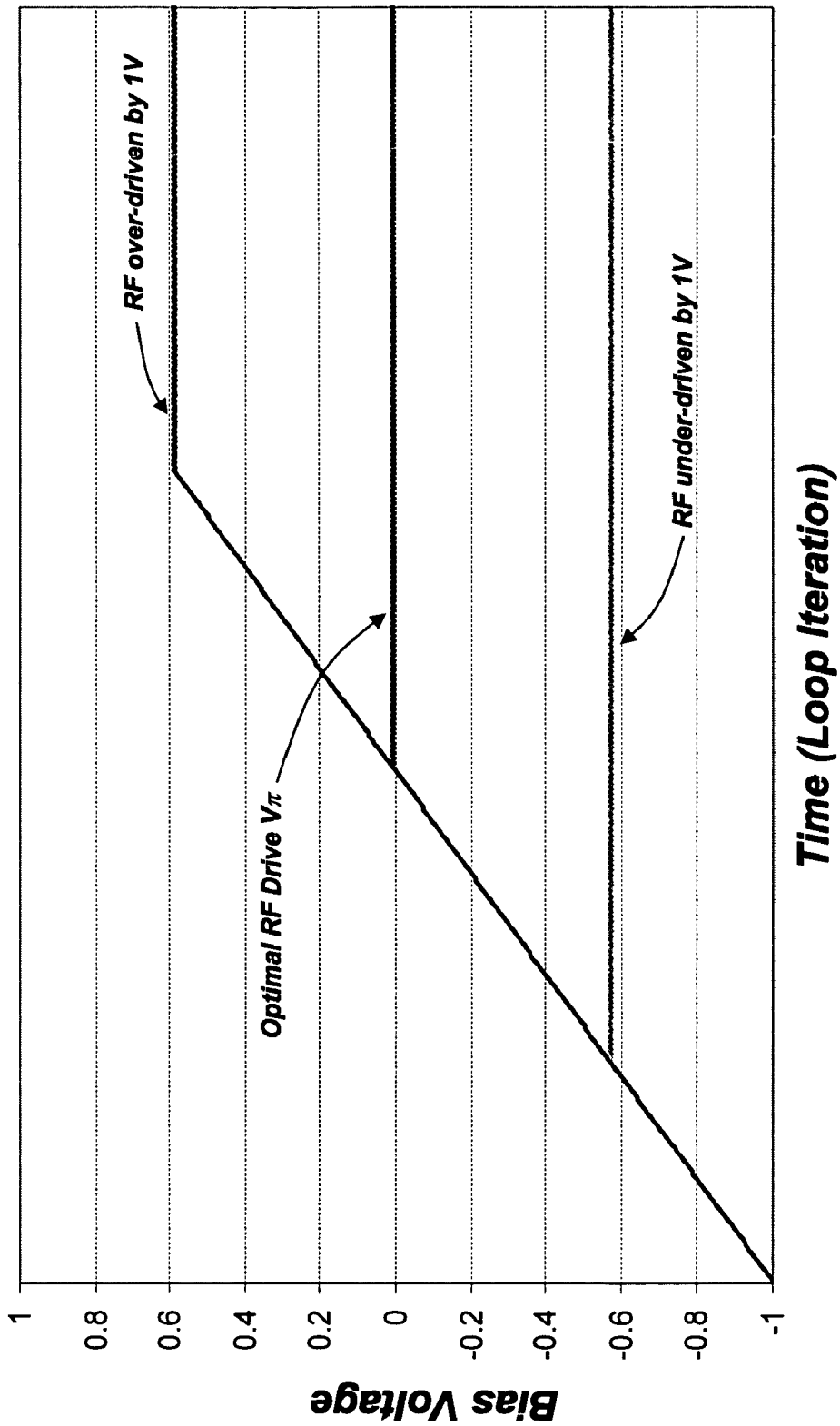
FIG. 8 is a graph illustrating the response of the software control algorithm of FIG. 6 when the RF drive level is over-driven by 1 V, under-driven by 1 V, and optimally driven between the maximum and minimum transmission points.
Figure 9:
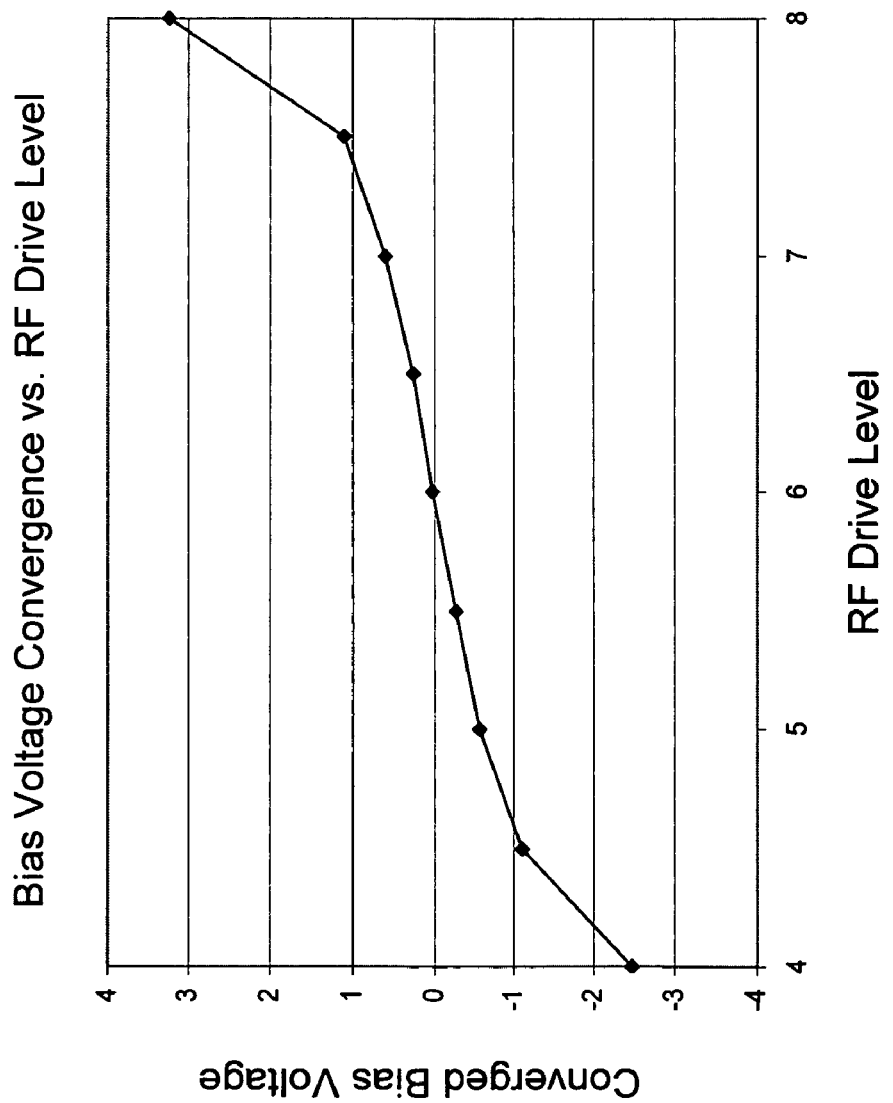
FIG. 9 is a graph illustrating the resultant converged bias voltage of the software control algorithm of FIG. 6 as a function of the RF drive level, where the quadrature bias voltage is 0 V.

FIG. 8 illustrates the response of the software control algorithm 600 (FIG. 6). The results show the bias voltage converging to near quadrature of 0 V when the RF drive level is optimally equal to Vπ. Note, the small error away from 0 V is due to the quantization error of the A/D converter 150 (FIG. 1) and may be made smaller by using higher resolution. However, when the RF drive level is far from the optimum value, there is a relatively large error in the final converged value. When the RF drive is under-driven by 1 V, the converged bias voltage is −570 mV. When the RF drive is over-driven by 1 V, the converged bias voltage is 590 mV. FIG. 9 illustrates the results of converged bias voltage for varying RF drive levels. At a drive level of 4 V, for example, the converged bias voltage is 2.5 V away from the quadrature point.

In order to improve the software control algorithm 600 (FIG. 6), a secondary control loop is utilized that optimizes the RF drive level using average power measurements at the zero slope points. The RF drive level optimization consists of first, finding the bias voltage which results in zero slope, defined as the average power change given an incremental bias voltage change. At the zero slope point, an average power measurement is taken. The RF drive is then increased or decreased, and again the bias voltage is adjusted to yield the zero slope point. Another average power measurement is taken and this value is compared to the value at the previous RF drive level. At the optimal RF drive level, the average power will be a minimum at the zero slope point.

Figure 10:
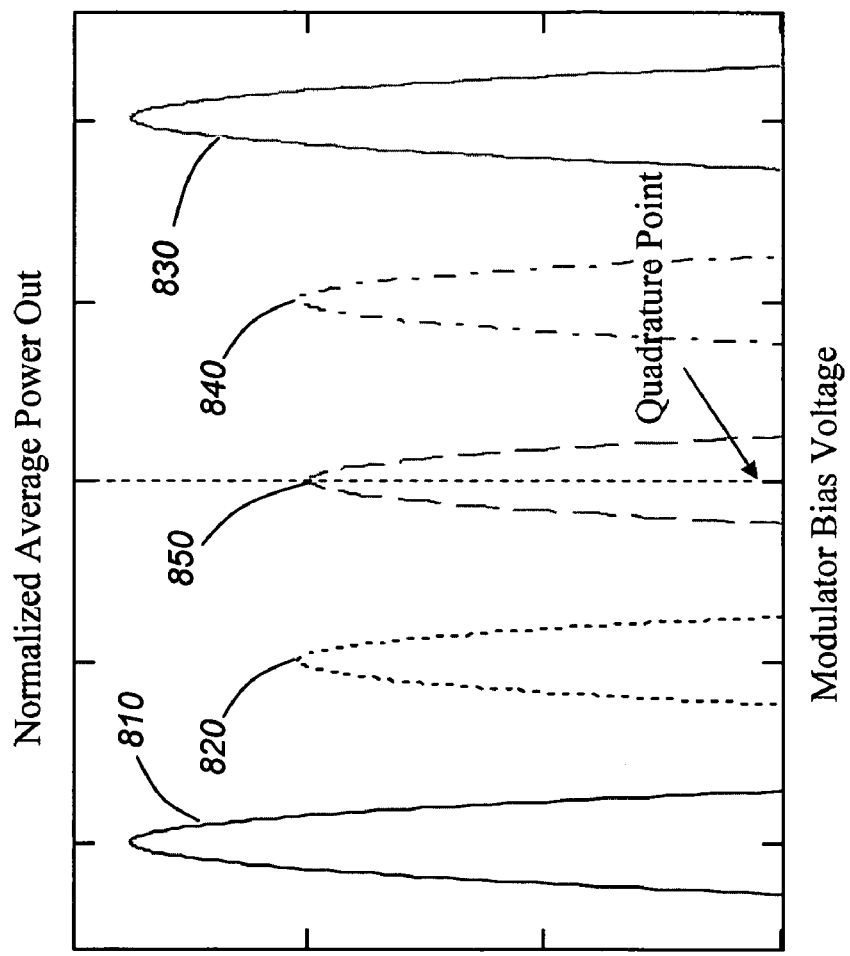
FIG. 10 is a graph illustrating the normalized average power response of the modulator for varying values of the RF drive level, similar to FIG. 7, but illustrated at a larger scale around the quadrature voltage and at the maximum normalized power.
Figure 11:
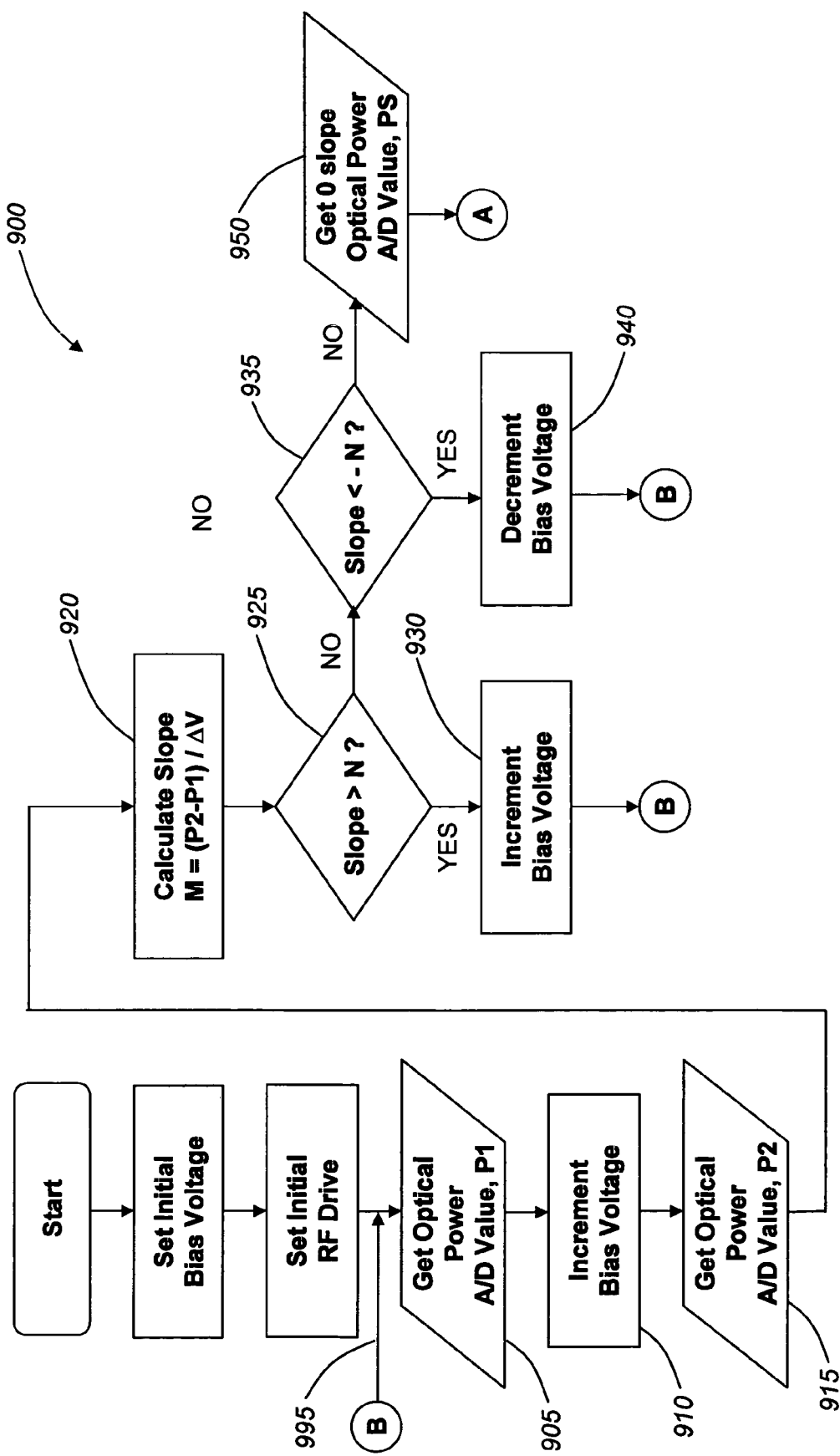
FIG. 11 is a flowchart illustrating another exemplary embodiment of a software control algorithm for controlling the modulator to the quadrature point, which includes an enhancement for RF drive level optimization.
Figure 12:
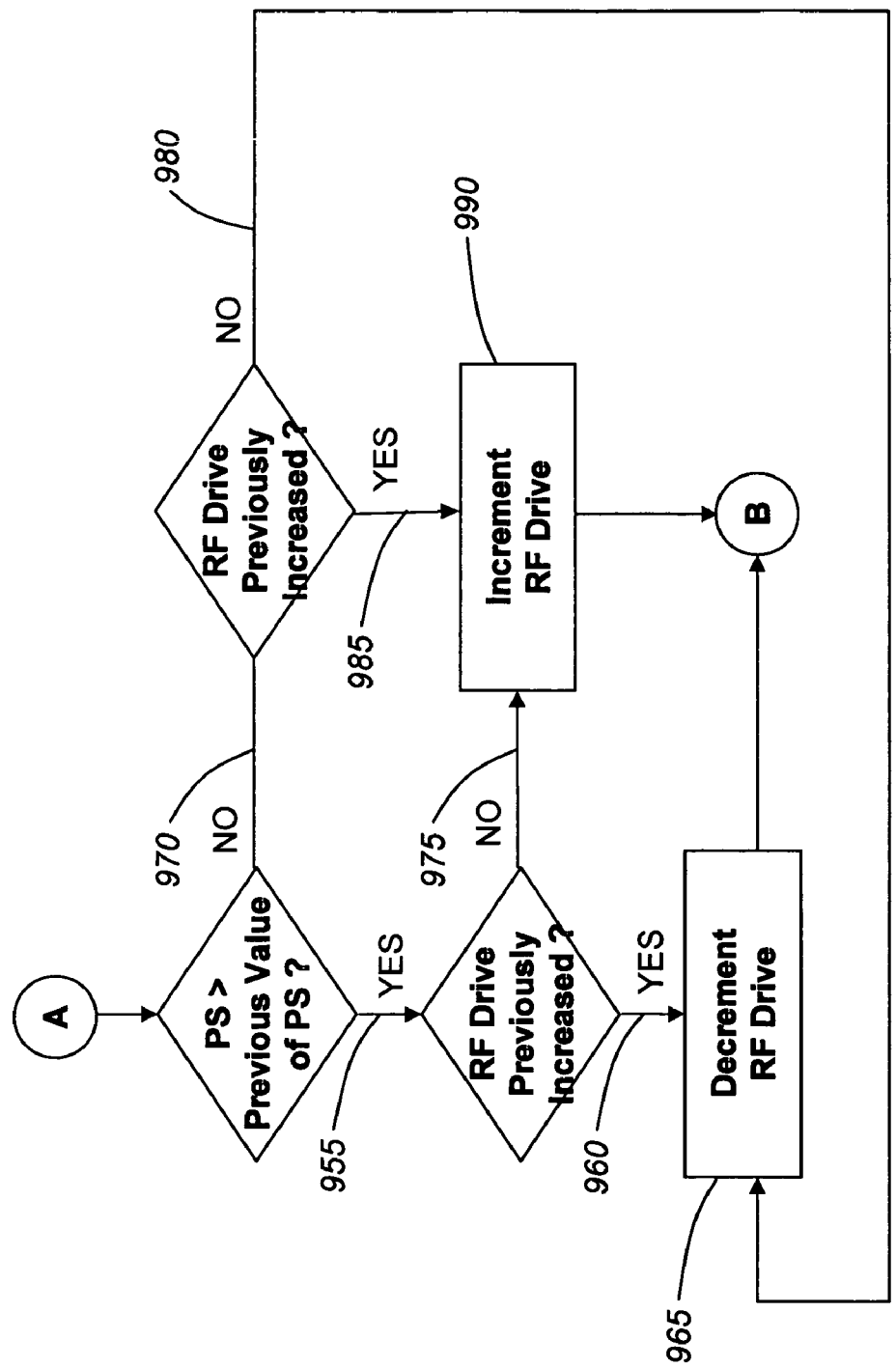
FIG. 12 is a continuation of the flowchart of FIG. 11.

FIG. 10 illustrates the response of the average modulated power for varying RF drive levels of the modulator port 190 (FIG. 1). The modulator response 810 is for an RF drive that is under-driven by 200 mV, and the power at the zero slope point is the same as for the modulator response 830 which is for the case for an RF drive that is over-driven by 200 mV. The modulator response 820 is for an RF drive that is under-driven by 100 mV, and the power at the zero slope point is the same as for the modulator response 840 which is for the case for an RF drive that is over-driven by 100 mV, but is less than the average modulated power at the zero slope point when the RF drive is either under-driven or over-driven by 200 mV 810, 830. The modulator response 850 is for an RF drive that is optimal, where the RF port 190 is driven between the maximum 340 and minimum 330 insertion loss points of the modulator, and the average modulated power at the zero slope point is at the minimum value. The modified software control algorithm 900 is illustrated in FIG. 11. At the point where the slope, defined as the average power change given an incremental bias voltage change, is zero, a relatively simple test is performed to determine if the modulator RF port 190 (FIG. 1) is being over or under-driven. At the point of zero slope, if the RF drive level is increased, and if the resulting average power at the new zero slope point decreases, then the modulator RF port 190 is being under-driven and the RF level must be increased further. If the average power increases, then the modulator RF port 190 was over-driven and the RF drive level must be decreased. If the RF drive level is decreased, and the resulting average power at the new zero slope point decreases, then the modulator RF port 190 is being over-driven and the RF drive level must be decreased further. If the average power increases, then the modulator RF port 190 is being under-driven and the RF level must be increased.

Therefore, referring again to FIG. 11, the modified software control algorithm 900 for controlling the modulator 120 (FIG. 1) to the quadrature point includes obtaining an average modulated power measurement and digitizing the value using the A/D converter 150 (FIG. 1) to obtain value P1 905, incrementing the bias voltage 910, obtaining another average modulated power measurement and A/D converter value P2 915, and calculating the resultant slope of the average modulated power ([P2-P1]/bias voltage increment) 920. If the slope of the average modulated power is greater than some threshold N 925 which is near the point of zero slope, then the bias voltage is less than the quadrature point, and so the bias voltage is increased 930. If the slope of the average modulated power is less than −N 935, then the bias voltage is greater than the quadrature point and so the bias voltage is decreased 940. This process is repeated until the slope of the average modulated power falls within the range between +N and −N which is near the point of zero slope of average modulated power. The value N is chosen for best performance based on the A/D resolution, bias voltage increment, and RF voltage increment. Once the slope is within this range, an optical power measurement is taken 950 and compared to the value from the previous iteration. If the current value of the average power at the zero slope point is greater than the previous value 955, and if the RF drive level was previously increased 960, then the RF drive level is being over-driven and the RF drive is decreased 965. If the current value of the average power at the zero slope point is greater than the previous value 955, and if the RF drive level was previously decreased 975, then the RF drive level is being under-driven and the RF drive is increased 990. If the current value of the average power at the zero slope point is less than the previous value 970, and if the RF drive level was previously increased 985, then the RF drive level is being under-driven and the RF drive is increased 990. If the current value of the average power at the zero slope point is less than the previous value 970, and if the RF drive level was previously decreased 980, then the RF drive level is being over-driven and the RF drive is decreased 965. The whole process is then repeated 995.

Figure 13:
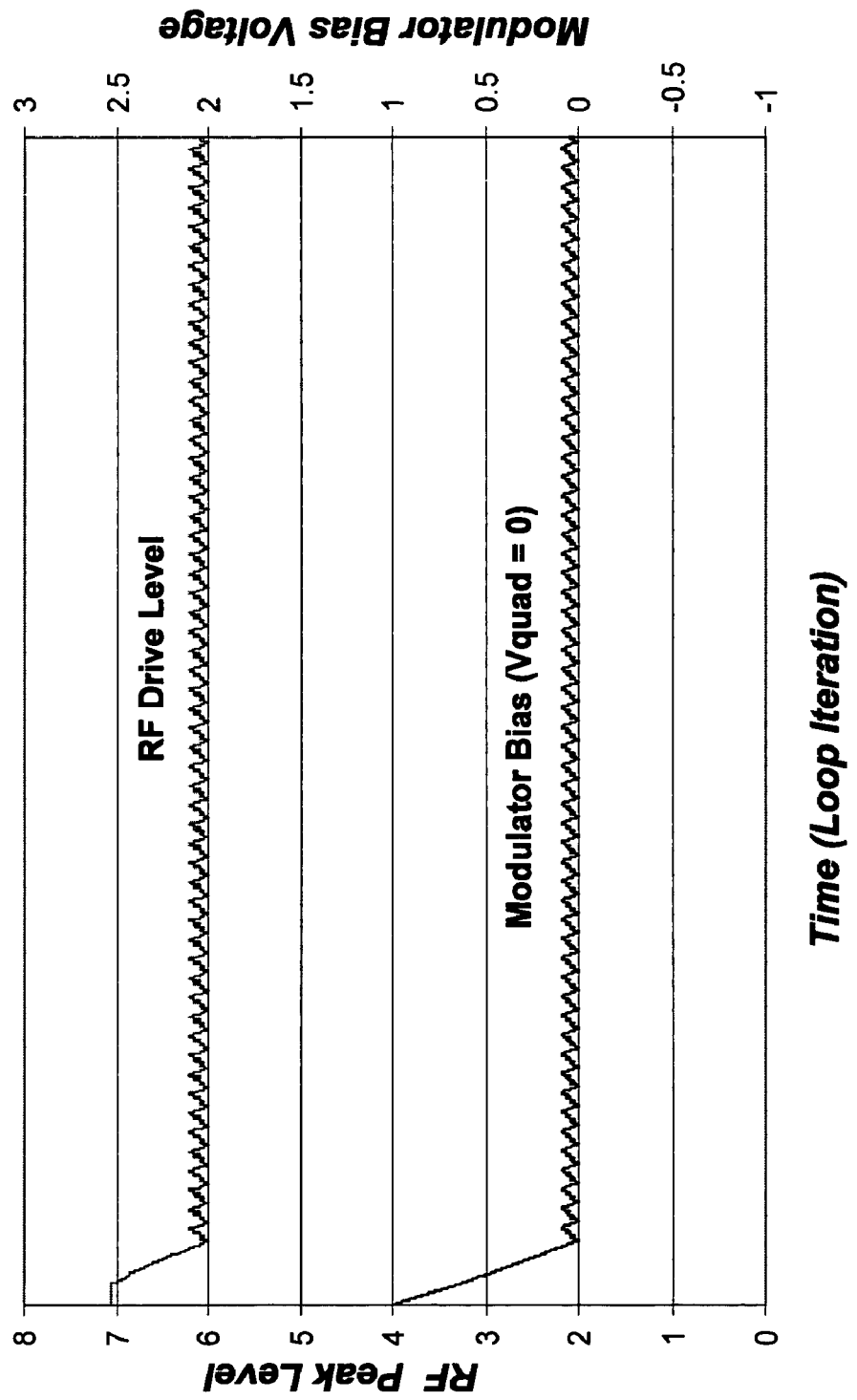
FIG. 13 is a graph illustrating the response of the software control algorithm of FIG. 11 when used with a 20-bit resolution A/D converter.
Figure 14:
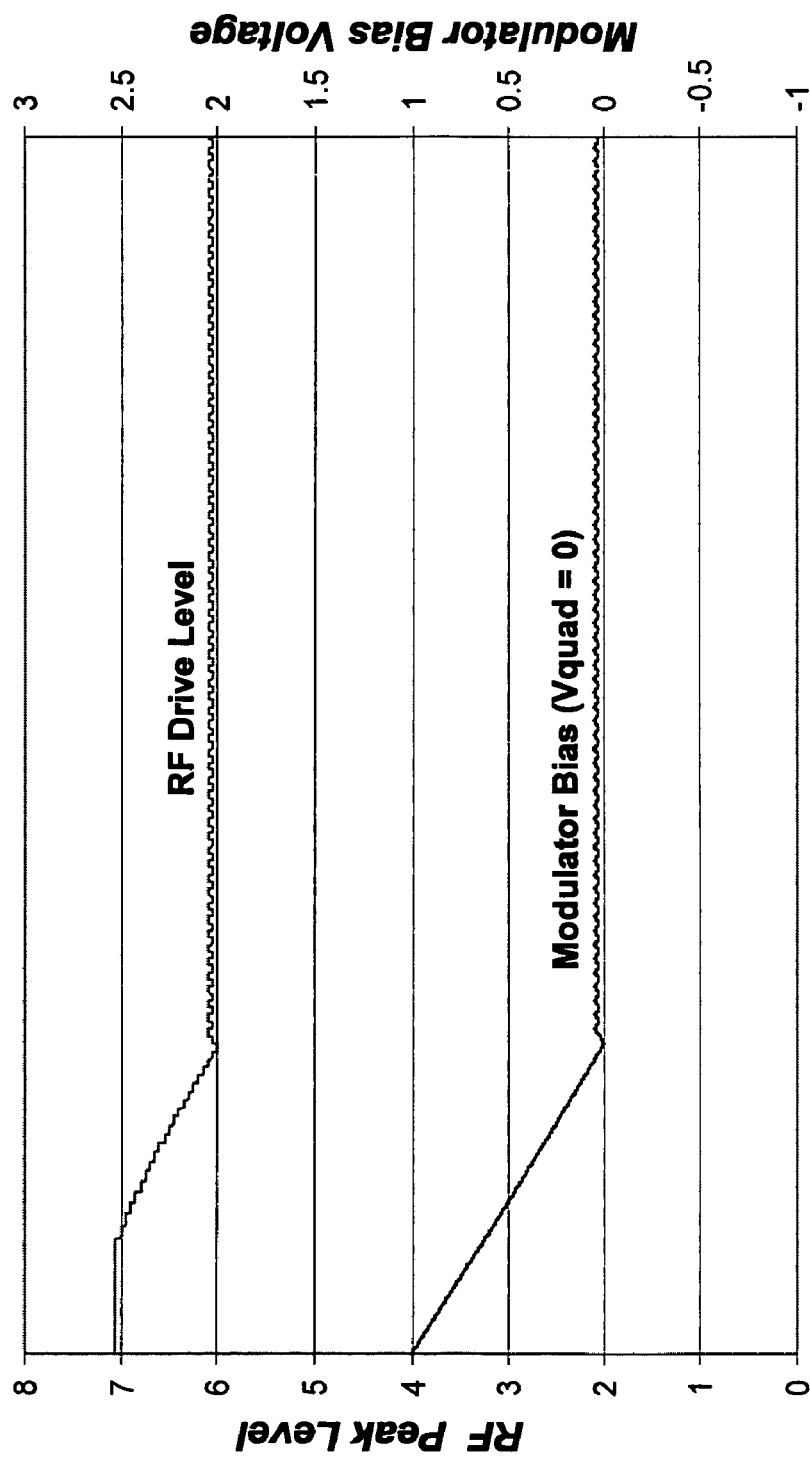
FIG. 14 is a graph illustrating the response of the software control algorithm of FIG. 11 when used with a 24-bit resolution A/D converter.

Computer simulations of the software control algorithm 900 were run. A starting value of 1 V was assumed for the initial bias voltage, with 0 V being the quadrature point. A starting value of 7 V was further assumed for the peak level of the RF signal, with 6 V being the optimal RF drive level. FIG. 13 illustrates the response of the software control algorithm 900 (FIG. 11). The results show the bias voltage converging to near 0 V and the RF drive level converging to near 6 V. The algorithm actually causes the bias voltage to dither by 95 mV near the 0 V quadrature point, and the RF drive level to dither by 200 mV near the optimal 6 V drive level. This is due to the quantization noise of the A/D converter 150 (FIG. 1) and the fact that there is only a small power change at the zero slope points when the RF drive is varied near the quadrature point. The performance may be enhanced by using a higher resolution A/D converter, or by performing averaging on the A/D measurements. FIG. 14 illustrates the performance of the algorithm 900 using a 24-bit A/D converter. The resulting simulation shows the bias voltage dither reduced to 22 mV near the 0 V quadrature point, and the RF drive level dither reduced to 50 mV near the optimal 6 V.

Advantageously, the systems and methods of the present invention require no complicated hardware, other than that which already exists within an optical transmitter module. The systems and methods of the present invention are unique in that they rely on software to control the electro-optic modulator bias. The systems and methods of the present invention are unique in that the basic control algorithm is independent of the absolute CW input power applied to the modulator, and, therefore, impervious to optical power fluctuations. The systems and methods of the present invention are also unique in that the basic control algorithm is independent of any parameter that would cause changes in either the absolute CW power applied to the modulator, or to the detected average modulated power. Therefore, the algorithm is impervious to such parameter changes as temperature or aging which may cause a change for one, in the detected average modulated power due to a change in photodetector responsivity. A secondary control loop utilizing RF drive level optimization is employed to prevent large errors in the converged bias voltage due to sub-optimum RF drive levels. The conventional method of tone detection for closing the bias control loop requires that the driver amplifier that amplifies the RF data signal up to the V, voltage amplitude be capable of amplitude modulating its RF output with the feedback tone signal. Many driver amplifiers do not have this capability built into their design, or simply do not implement the amplitude modulation very well. The systems and methods of the present invention eliminate the need for amplitude modulating the RF drive signal, thus removing this requirement from the driver amplifiers. Finally, the systems and methods of the present invention incorporate an optimum RF drive level control loop, without the need for additional RF detectors and the associated electronic circuitry typically used for RF level control.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A software-based electro-optic modulator bias control system resident in an optical transceiver comprising an electro-optic modulator, comprising:
    an optical-to-electrical converter comprising a transimpedance amplifier;
    an analog-to-digital converter;
    a software algorithm, wherein the software algorithm is operable for determining an optimum bias voltage applied to the electro-optic modulator by discovering a maximum average optical power transmitted by the electro-optic modulator, or quadrature point, wherein the quadrature point is discovered by determining at what bias voltage the slope of an average optical power transmitted by the electro-optic modulator, defined as an optical power change given an incremental bias voltage change, is equal to zero; and
    a software control loop operable for determining if a radio frequency port of the electro-optic modulator is driven with a voltage that is greater than (over-driven) or less than (under-driven) the peak-to-trough voltage of a response curve of the electro-optic modulator;
    wherein determining if a radio frequency port of the electro-optic modulator is driven with a voltage that is greater than (over-driven) or less than (under-driven) the peak-to-trough voltage of a response curve of the electro-optic modulator is performed by determining if, when a radio frequency drive level is increased, the average optical power transmitted by the electro-optic modulator at the point of zero slope increases compared to an average optical power at the point of zero slope at the previous radio frequency drive level, or, when the radio frequency drive level is increased, the average optical power transmitted by the electro-optic modulator at the point of zero slope decreases compared to the average optical power at the point of zero slope at the previous radio frequency drive level, respectively.

2. The software-based electro-optic modulator bias control system of claim 1, wherein a radio frequency port of the electro-optic modulator is driven with a peak-to-peak voltage that is equal to the peak-to-trough voltage of a response curve of the electro-optic modulator.

3. The software-based electro-optic modulator bias control system of claim 1, wherein, if the radio frequency port of the electro-optic modulator is over-driven, the radio frequency drive level is decreased.

4. The software-based electro-optic modulator bias control system of claim 1, wherein, if the radio frequency port of the electro-optic modulator is under-driven, the radio frequency drive level is increased.

5. The software-based electro-optic modulator bias control system of claim 1, wherein use of the software control loop is ceased when no optical power changes are detected.

6. The software-based electro-optic modulator bias control system of claim 1, wherein use of the software control loop is only undertaken when the radio frequency drive level falls outside of a predetermined optimum range.

7. The software-based electro-optic modulator bias control system of claim 1, wherein the software algorithm is further operable for determining in which of a plurality of regions of a response curve of the electro-optic modulator the electro-optic modulator is operating.

8. The software-based electro-optic modulator bias control system of claim 1, wherein the electro-optic modulator is operated at a multiple of the quadrature point.

9. An optical transceiver comprising an electro-optic modulator and a software-based electro-optic modulator bias control system, comprising:
    an optical-to-electrical converter comprising a transimpedance amplifier;
    an analog-to-digital converter;
    a software algorithm, wherein the software algorithm is operable for determining an optimum bias voltage applied to the electro-optic modulator by discovering a maximum average optical power transmitted by the electro-optic modulator, or quadrature point, wherein the quadrature point is discovered by determining at what bias voltage the slope of an average optical power transmitted by the electro-optic modulator, defined as an optical power change given an incremental bias voltage change, is equal to zero; and
    a software control loop operable for determining if a radio frequency port of the electro-optic modulator is driven with a voltage that is greater than (over-driven) or less than (under-driven) the peak-to-trough voltage of a response curve of the electro-optic modulator;
    wherein determining if a radio frequency port of the electro-optic modulator is driven with a voltage that is greater than (over-driven) or less than (under-driven) the peak-to-trough voltage of a response curve of the electro-optic modulator is performed by determining if, when a radio frequency drive level is increased, the average optical power transmitted by the electro-optic modulator at the point of zero slope increases compared to an average optical power at the point of zero slope at the previous radio frequency drive level, or, when the radio frequency drive level is increased, the average optical power transmitted by the electro-optic modulator at the point of zero slope decreases compared to the average optical power at the point of zero slope at the previous radio frequency drive level, respectively.

10. The optical transceiver of claim 9, wherein a radio frequency port of the electro-optic modulator is driven with a peak-to-peak voltage that is equal to the peak-to-trough voltage of a response curve of the electro-optic modulator.

11. The optical transceiver of claim 9, wherein, if the radio frequency port of the electro-optic modulator is over-driven, the radio frequency drive level is decreased.

12. The optical transceiver of claim 9, wherein, if the radio frequency port of the electro-optic modulator is under-driven, the radio frequency drive level is increased.

13. The optical transceiver of claim 9, wherein use of the software control loop is ceased when no optical power changes are detected.

14. The optical transceiver of claim 9, wherein use of the software control loop is only undertaken when the radio frequency drive level falls outside of a predetermined optimum range.

15. The optical transceiver of claim 9, wherein the software algorithm is further operable for determining in which of a plurality of regions of a response curve of the electro-optic modulator the electro-optic modulator is operating.

16. The optical transceiver of claim 9, wherein the electro-optic modulator is operated at a multiple of the quadrature point.

17. A software-based electro-optic modulator bias control method for use in an optical transceiver comprising an electro-optic modulator, said method comprising: a transimpedance amplifier for converting an optical signal to an electrical signal;
    an analog-to-digital converter for converting the electrical signal to a digital signal;
    determining an optimum bias voltage applied to the electro-optic modulator by discovering a maximum average optical power transmitted by the electro-optic modulator, or quadrature point, wherein the quadrature point is discovered by determining at what bias voltage the slope of an average optical power transmitted by the electro-optic modulator, defined as an optical power change given an incremental bias voltage change, is equal to zero; and
    determining if a radio frequency port of the electro-optic modulator is driven with a voltage that is greater than (over-driven) or less than (under-driven) the peak-to-trough voltage of a response curve of the electro-optic modulator; wherein determining if a radio frequency port of the electro-optic modulator is driven with a voltage that is greater than (over-driven) or less than (under-driven) the peak-to-trough voltage of a response curve of the electro-optic modulator is performed by determining if, when a radio frequency drive level is increased, the average optical power transmitted by the electro-optic modulator at the point of zero slope increases compared to an average optical power at the point of zero slope at the previous radio frequency drive level, or, when the radio frequency drive level is increased, the average optical power transmitted by the electro-optic modulator at the point of zero slope decreases compared to the average optical power at the point of zero slope at the previous radio frequency drive level, respectively.

18. The software-based electro-optic modulator bias control method of claim 17, wherein a radio frequency port of the electro-optic modulator is driven with a peak-to-peak voltage that is equal to the peak-to-trough voltage of a response curve of the electro-optic modulator.

19. The software-based electro-optic modulator bias control method of claim 17, wherein, if the radio frequency port of the electro-optic modulator is over-driven, the radio frequency drive level is decreased.

20. The software-based electro-optic modulator bias control method of claim 17, wherein, if the radio frequency port of the electro-optic modulator is under-driven, the radio frequency drive level is increased.

21. The software-based electro-optic modulator bias control method of claim 17, wherein use of the software control loop is ceased when no optical power changes are detected.

22. The software-based electro-optic modulator bias control method of claim 17, wherein use of the software control loop is only undertaken when the radio frequency drive level falls outside of a predetermined optimum range.

23. The software-based electro-optic modulator bias control method of claim 17, wherein the software algorithm is further operable for determining in which of a plurality of regions of a response curve of the electro-optic modulator the electro-optic modulator is operating.

24. The software-based electro-optic modulator bias control method of claim 17, wherein the electro-optic modulator is operated at a multiple of the quadrature point.

* * * * *